(12) United States Patent
Itzkowitz

(10) Patent No.: US 7,068,927 B2
(45) Date of Patent: Jun. 27, 2006

(54) FRAME ASSEMBLY FOR SUPPORTING A CAMERA

(76) Inventor: Arnold Itzkowitz, 214 Kinnelon Rd., Kinnelon, NJ (US) 07405

( * ) Notice: Subject to any disclaimer, the term of this patent is extended or adjusted under 35 U.S.C. 154(b) by 0 days.

(21) Appl. No.: 10/902,946

(22) Filed: Aug. 2, 2004

(65) Prior Publication Data

US 2005/0031335 A1    Feb. 10, 2005

Related U.S. Application Data

(60) Provisional application No. 60/513,549, filed on Oct. 24, 2003, provisional application No. 60/499,731, filed on Sep. 4, 2003, provisional application No. 60/492,315, filed on Aug. 5, 2003.

(51) Int. Cl.
G03B 39/00 (2006.01)
G03B 17/00 (2006.01)

(52) U.S. Cl. .......................... 396/13; 396/421; 396/428

(58) Field of Classification Search .................... 396/7, 396/12, 13, 419, 421, 428
See application file for complete search history.

(56) References Cited

U.S. PATENT DOCUMENTS

| | | | |
|---|---|---|---|
| 894,348 A | 7/1908 | Seele | |
| 1,211,527 A | 1/1917 | Berndt | |
| 1,525,877 A | 2/1925 | Miller | |
| 1,867,763 A | 7/1932 | Rose | |
| 3,467,350 A | * 9/1969 | Tyler | ........................... 248/636 |
| 3,485,151 A | * 12/1969 | Taylor | ........................... 396/12 |
| 3,925,794 A | 12/1975 | Alouges | |
| 4,017,168 A | 4/1977 | Brown | |
| 4,044,364 A | 8/1977 | Prinzo | |
| 4,645,320 A | 2/1987 | Muelling et al. | |
| 5,034,759 A | * 7/1991 | Watson | ........................... 396/7 |
| 5,113,768 A | * 5/1992 | Brown | ........................ 396/419 |
| 5,173,725 A | 12/1992 | Giles et al. | |
| 5,222,826 A | 6/1993 | Hanke | |
| 5,538,212 A | 7/1996 | Kennedy | |
| 5,568,189 A | 10/1996 | Kneller | |
| 5,721,997 A | 2/1998 | Powell et al. | |
| 6,056,449 A | 5/2000 | Hart | |
| 6,579,016 B1 | 6/2003 | Chapman | |

OTHER PUBLICATIONS

Itzkowitz, Arnold, Gyro Stabilized Video & Film Platform, Web page screen shot, aerialexposures.com/gyroplatform Aerial Exposures.com, LLC, Kinnelon, New Jersey, USA.
Glidecam Industries Inc., Glidecam V-16 and V-20, Web page screen shot taken Jul. 7, 2005 (glidecam.com/product-v-16.php, Glidecam Industries, Inc., Plymouth, MA.

(Continued)

*Primary Examiner*—Christopher Mahoney

(57) ABSTRACT

A generally C-shaped frame portion having upper and lower generally horizontal arms and a generally vertically positioned connecting member partially surrounds a camera receiving space. A plate pivotally mounted to the lower arm provides a mounting point for a camera and a plurality of gyroscopic stabilizers. One or more elastic cords rotatably attached to the upper arm permit the frame to be suspend from a suspension point in or on a moving and/or vibrating platform for swinging movement in any direction and rotation relative to the platform and provide vibration isolation from the platform. A collapsible stand having a heavy base, an upright and a cantilever arm may be used to provide the suspension point if one is not conveniently available in or on the platform.

18 Claims, 5 Drawing Sheets

OTHER PUBLICATIONS

Glidecam Industries Inc., Glidecam 2000 PRO, Web page screen shot take Jul. 25, 2005 (glidecam.com/product-2000-pro.php) Glidecam Industries, Inc., Plymouth, MA.

Glidecam Industries, Inc., Glidecam Custom Gyro Stabilizer, Web page screen shot taken Jul. 25, 2005 (glidecam.com/product-gyro-ks-4.php) Glidecam Industries, Inc., Plymouth, MA.

Glidecam Industries, Inc., Glidecam Vista Head web page screen shot taken Jul. 25, 2005 (glidecam.com/product-vista-head.php) Glidecam Industries, Inc., Plymouth MA.

* cited by examiner

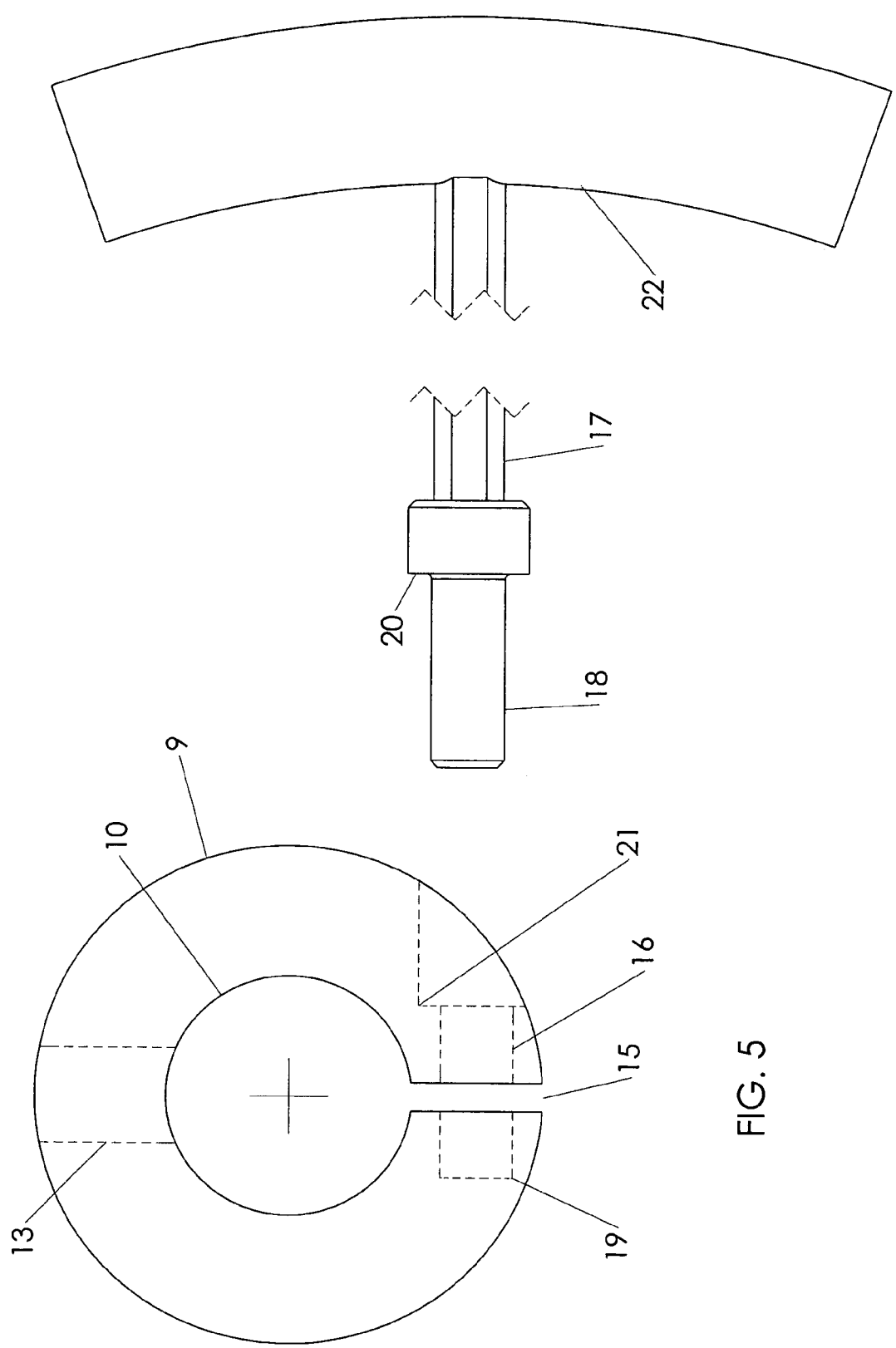

FRAME ASSEMBLY FOR SUPPORTING A CAMERA

CROSS REFERENCE TO RELATED APPLICATIONS

This application claims the benefit of the filing dates of Provisional Application for Patent application No. 60/492,315, filed Aug. 5, 2003 titled Frame Assembly for Supporting a Camera, and Provisional Application for Patent application No. 60/499,731 filed Sep. 4, 2003 titled Frame Assembly for Supporting a Camera, and provisional application for Patent Ser. No. 60/513,549 filed Oct. 24, 2003 titled Folding Stand for Photography

BACKGROUND OF THE INVENTION

1. Field of the Invention

The present invention relates to apparatus to facilitate stabile image capturing from a moving and/or vibrating platform. It includes a frame assembly for supporting an image capturing device such as a still camera, or more particularly, a digital, video tape or film motion picture camera, and means for suspending the frame assembly with respect to a moving platform. More particularly, the present invention relates to an apparatus for stably supporting a portable video camera in or on a moving platform, such as a person or vehicle, to allow the steady taping of objects or scenes with respect to which the platform may be moving. The apparatus of the present invention is suited for recording from a wide variety of moving platforms, by way of example and not limitation, aircraft, water craft and ground craft such as airplanes, helicopters, hang gliders, balloons, boats, submarines, trains, cars, trucks, bicycles, motorcycles, scooters, surf boards, elevators, animals and people.

2. Description of the Related Art

It has heretofore been difficult to stabilize, portable video and motion picture cameras. Certain uses of these cameras have been particularly difficult such as recording or filming from moving platforms.

Many modern video and still cameras, for example, have built in electronic or optical stabilizers. These stabilizers are helpful when the camera is held relatively still, to capture, for example, a distant landscape. However, when camera movement is made that exceeds the ability of the built in stabilizer to correct, the result is a jumping effect as the stabilizer attempts to reestablish a reference. This problem is seen particularly often when shooting from platforms which may exhibit sudden gross movement such as rapid and or unpredictable changes of direction and/or orientation. Even though the jumping effect is less pronounced when using optical stabilizers as compared to electronic stabilizers, neither stabilizer provides sufficient stability without major additional physical stabilization.

Many products are currently marketed to provide external stabilization for camera operators. The most common devices are tripods. Tripods offer stability, but even with high cost fluid heads tripods are ineffectual when shooting from rapidly and/or unpredictably moving platforms because they transmit the motion and/or vibration of the platform to the camera. The legs of the tripod are also an impediment to the freedom of motion of the camera operator.

Gyroscopically stabilized platforms are available, but these are extremely expensive, and are usually confined to use by well established professional photographers. The are heavy, expensive and require considerable power. Typically they are mounted outside the platform in or on which the operator is located. When mounted exteriorly of aircraft special certification is required from the Federal Aviation Administration. They are inappropriate for hobby video or film work or purchase by professionals with limited financial resources.

One device, presently sold by Glidecam Industries of Plymouth, Mass. whose web address is http://www.glidecam.com, the Glidecam 2000 Pro (TM), uses a system of weights and balances to stabilize a handheld video camera. However, use of this device requires the camera operator to hand hold all the weight of the apparatus and camera in front of himself, and thus causes significant fatigue in the operator. In addition, the camera operator cannot use the camera's view finder, but must look directly at the object. This apparatus is limited to use with cameras weighing only up to six pounds. A accessory for use with this product, the Glidecam Body-Pod (TM) provides a post that nests in a pocket on a camera operator's belt. This belt assembly could support a considerable amount of weight, and might otherwise be useful, but still does not provide sufficient stability for all uses and requires that the operator's hands be on the camera at all times. Other models have increased weight carrying capacity but suffer from the same drawbacks. Their most sophisticated frame assembly, the Glidecam V-20 and its associated accessories per ports to allow you to "shoot from moving vehicles and travel over uneven terrain without camera instability or shake" but lacks gyroscopic stabilization and is extremely expensive.

Another device, The Pro Camcorder Shoulder Rest, is sold by Video Innovators, of Frisco, Colo. whose web address is http://www.videoinnovators.com. This device is a hand-held mounting bar on which a camera is mounted. At the end of the device in front of the camera operator is a handle pointing downward, which the camera operator grips to stabilize the camera and support most of its weight. At the shoulder, the rest is curved and padded in order to rest comfortably on the camera operator's shoulder. In spite of claims to the contrary, when a camera is mounted on one of the rests, it is not positioned so that the camera operator can comfortably look into the viewfinder. While shifting some of the camera's weight to the operator's shoulder may be of assistance, the entire unit is unstable to tilting, i.e., the camera can be easily tilted causing extreme instability in the resulting video footage. Their The Vehicle Camera Dash Mount is inexpensive and they do aver that it "makes taking your pictures with your camcorder (sic) smooth and easy while traveling at highway speeds," but does not appear to have any mechanism to isolate vibration or compensate for rapid and/or extreme shifts in position or orientation of the car, and appears to work only in cars and only if they have a windshield.

A portable camera assembly having a shoulder rest, a hand grip and a camera mount is also disclosed in U.S. Pat. No. 4,963,904 to Lee. A gun stock camera rest, is disclosed in U.S. Pat. No. 2,806,416 to Jones. A support for photographic cameras with shoulder straps, a belt and various support and cross bars is disclosed in U.S. Pat. No. 2,552,205 to Moss. However, these devices all have the disadvantages of the Camcorder Shoulder Rest, discussed above.

Monopods have also been used in the past, and can provide some stability when grasped about 12" below the body of the camera. One such monopod is disclosed in the Jones patent, cited above. Nonetheless, the stability obtained with monopods is still not acceptable.

Various types of shoulder harnesses for supporting cameras have been proposed in the prior art, but none provide a stable, inexpensive and versatile solution to supporting a portable video camera. For example, U.S. Pat. No. 2,746, 369 to Beard et al., discloses a shoulder camera mount with pistol grips for supporting telephoto and long focus lenses. The patent discloses, for example, that the weight of the "camera gun" is so distributed that the center of gravity thereof at elevated positions is substantially disposed to fall along a line through the shoulders and torso of the operator. However, it is clear that at normal elevations, or at angles below the horizontal, a great deal of the weight of a telephoto lens for example, would be placed in the hands of a user, causing eventual fatigue. No means for adjusting the center of gravity of the assembly, for example, is provided.

A camera support is disclosed in U.S. Pat. No. 3,332,593 to Fauser, in which "body-engaging tubular members" and "body-engaging" rollers attach the support to the body. Similar shoulder harness supports are disclosed in U.S. Pat. No. 5,073,788 to Lingwall, U.S. Pat. No. 4,526,308 to Dovey, U.S. Pat. No. 2,873,645 to Horton, and U.S. Pat. No. 2,636,822 to Anderson. These devices have, among others, the disadvantage of being unable to move independently of the body of the operator.

U.S. Pat. No. 2,945,428 to Dearborn discloses a camera stabilizer with a tubular frame, a camera mounting portion and balancing masses disposed on opposite sides of the apparatus. However, the frame is specifically intended not to be rested on the shoulders of the operator. The entire weight is supported by the users arms, or, in other disclosed embodiments, a combination of the users arms and a monopod or belt harness, so that use of this device would lead to unnecessary fatigue.

U.S. Pat. No. 6,056,449 to Hart discloses a camera stabilizer with a frame which rests on the shoulders of an operator, in which the camera is mounted on a portion the frame in front of the operator and a counterweight, which may also be a gyroscope mechanism, is mounted to the frame behind the operator. This arrangement is not suitable, and may even be dangerous, when the operator is located in or on a moving platform or in a crowd. The necessarily large front to rear dimensions of the frame render it unsuitable for use within the confines of a small airplane or helicopter, passenger automobile and the like. The addition of the weight of the apparatus on the upper torso of the operator, especially when combined with the effects of the gyro can easily cause the operator to loose his/her balance when standing in or on most movable platforms such as airplanes, helicopters and boats which are subject to rapid and large shifts of position and orientation. The relatively long extension of the frame behind the operator and out of his field of view can cause it to strike bystanders as the operator moves about.

Tyler Camera Systems of Van Nuys, Calif., whose web address is www.tylermount.com, offers a number of camera mount systems that provide excellent stability when used in helicopters and other vehicles. Their systems are mostly rented, must be insured for hundreds of thousands of dollars and are economically out of the range of most photographers. Their Middle Mount II and Major mount systems are counterbalanced boom type assemblies pivoted to upright supports mounted on bases. Some models have optional "gyro assist". Their nose mount and ball mount systems are externally mounted to the helicopter and differ substantially from the present invention.

BRIEF SUMMARY OF THE INVENTION

The invention is a frame assembly having a mounting plate on which can be mounted a video, film or still camera and/or associated accessories. The plate can be rotatably mounted on the frame to permit the camera to be tilted. Gyroscopic stabilizers (gyros) can be mounted to the underside of the plate to stabilize the plate and frame against pitch, roll and yaw. Means is provided to suspended the frame assembly in such a way as to permit the frame assembly to move relatively freely in any direction with respect to the platform on or in which it is used and to isolate it from vibrations present in and sudden gross movements of such platform. The means to suspend includes a resilient cord and safety strap for connection to a preexisting hook or other suspension point on the moving platform. When the platform does not have a suitable preexisting suspension point the means to suspend the frame may itself include a stand having one or more uprights supporting a cantilever arm providing the suspension point and which may be positioned in or on the platform.

It is therefore an object of the present invention to provide a frame assembly for supporting a camera which when used with gyroscopic stabilizers provides stability approaching that of the most expensive commercial systems while providing increased versatility at a cost closer to the simplest hand held and body mounted systems It is another object of the present invention to provide a frame assembly which is inexpensive, relatively light and compact, easy to use especially in confined spaces and safe for the operator and bystanders.

It is a further object of the present invention to provide a frame assembly for a video camera which is extremely stable and maneuverable, and which does not cause fatigue in the operator.

Another object of the present invention is to provide a frame assembly for mounting a video or other type of camera which is safe for use in or on a wide variety of moving platforms subject to rapid and/or extreme shifts in position or orientation.

Another object of the present invention is to provide a frame assembly for mounting a video and other types of camera which will isolate the camera from vibrations in the platform in or on which it is used.

It is therefore an object of the present invention to provide a break down or folding stand as a part of a means for suspending a camera frame assembly which provides stability approaching that of the most expensive commercial systems while providing increased versatility at a cost closer to the simplest hand held and body mounted systems It is another object of the present invention to provide a folding support which is inexpensive, easy to use especially in confined spaces and safe for the operator and bystanders when used properly.

It is a further object of the present invention to provide a break down or folding stand which is extremely stable and which eliminate fatigue in the operator.

Another object of the present invention is to provide a break down or folding stand which can rest on a suitable surface of a wide variety of moving platforms subject to shifts in position or orientation.

Another object of the present invention is to provide a breakdown or folding stand which can be shipped, transported and stored in a compact, space saving configuration.

BRIEF DESCRIPTION OF THE SEVERAL VIEWS OF THE DRAWINGS

FIG. 5 shows a side view of the split collar of the invention.

FIG. 6 shows a side view of the tightening member of the invention.

DETAILED DESCRIPTION OF THE PREFERRED EMBODIMENTS

Figure 1:
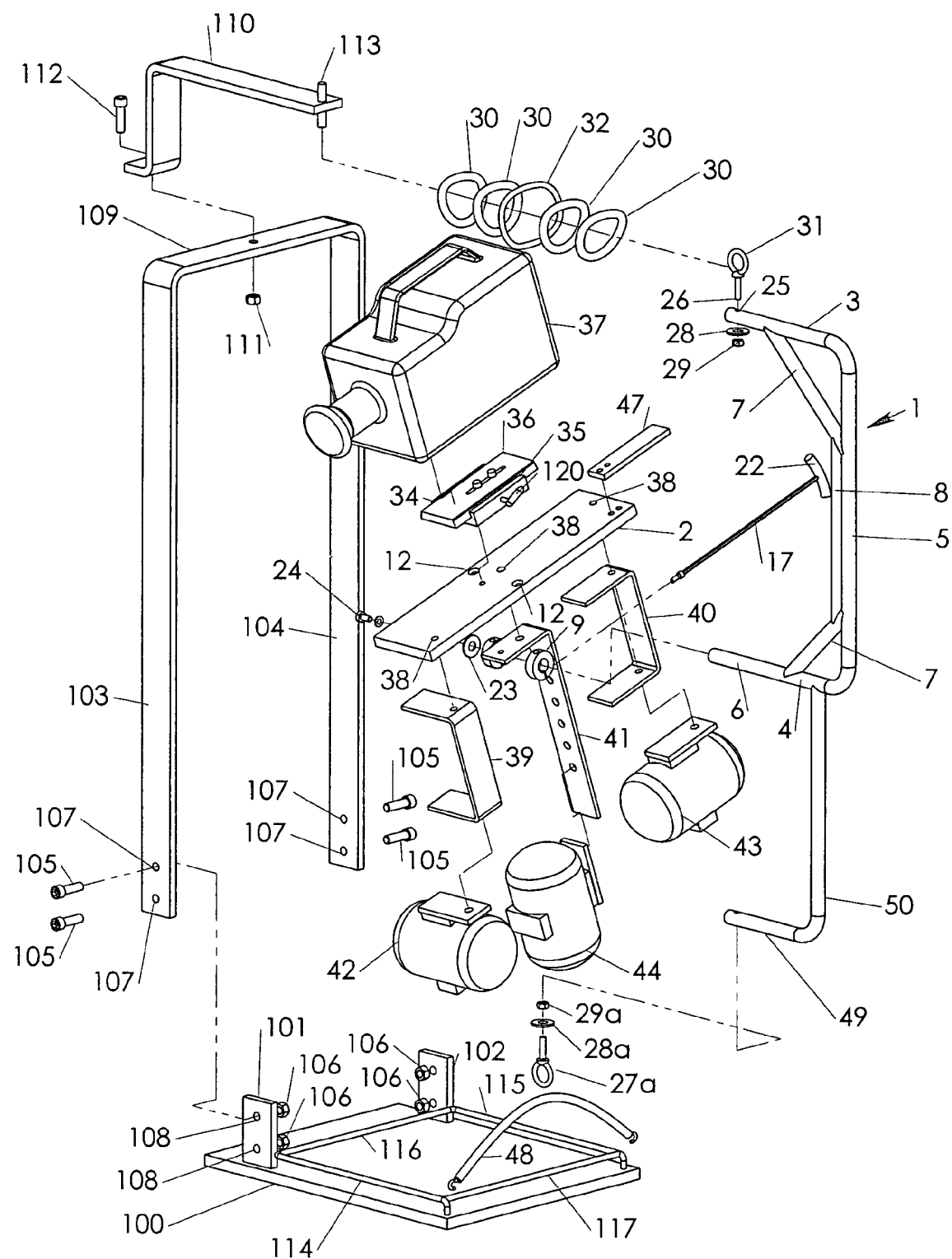
FIG. 1 shows an exploded perspective view of the invention.

The preferred embodiments of the present invention will now be described in more detail with reference to the drawings in which a preferred embodiment of the frame assembly is depicted in FIGS. 1–6.

A suspension frame 1 carries an aluminum camera mounting plate 2. Suspension frame 1 has an upper horizontal arm 3, a lower horizontal arm 4 and vertical connecting arm 5. In the preferred embodiment the three arms lie in a common first vertical plane and are straight. The horizontal arms are perpendicular to the vertical arm and are formed from one continuous piece of round aluminum bar stock for light weight and strength. It is to be understood that except for a portion 6 of the lower arm 4 the exact shape and cross section of the arms is not important beyond the need to provide sufficient rigidity and space within the suspension frame for the mounting plate 2 and any apparatus mounted thereon such as a video, movie or still camera, and access to the controls of such apparatus by the operator. Likewise, any or all of the arms may be separate elements suitably fastened to each other as by welding, bonding, bolting, screwing and the like. Other materials could also be used for the suspension frame and mounting plate such as iron, steel, plastic and composites. An optional diagonal brace 7 may extend between arms 3 and 5 and/or arms 4 and to rigidify the frame. The portion of the connecting arm 5 between the ends of the braces may also optionally be reinforced by a bar 8 affixed to that section.

The mounting plate 2 is rotatably mounted to the portion 6 to permit a camera mounted on the plate pointing laterally of the frame assembly to be aimed up and down. This is accomplished by a pair of spaced apart collars 9 with circular through openings 10 affixed to the underside 11 of the mounting plate 2. The collars 9 are secured to the underside of mounting plate 2 by bolts passing through holes 12 in mounting plate 2 and threaded into holes 13 in the collars 9. It is to be understood that the collars 9 may be attached to the mounting plate using any conventional suitable mounting technique or fastening device such as bonding, welding, bolting, screwing and the like. The collars 9 may optionally be provided with a flat spot where they engage the underside 11 of the mounting plate 2 to provide a more stable attachment. The portion 6 of the lower arm 4 is round and straight for a length at least equal to the distance between the outer edges of the collars 9. The diameter of the openings 10 in the collars is slightly greater than the diameter of the portion 6. The collars 9 are positioned on the portion 6 to mount the mounting plate 2 on the suspension frame 1. Because the diameter of the collars is slightly greater than the diameter of the portion 6 the fit is such that they are free to rotate about and slide along the portion 6. In the preferred embodiment at least one of the collars is a split collar having a gap 15. A bore 16 in the collar 9 extends through the collar 9 on one side of the gap 15 and into the collar 9 on the other side of the gap 15. A tightening member 17 is threaded at one end 18 and engages mating threads 19 in the portion of the bore 16 on the other side of the gap. The tightening member 17 also has a shoulder 20. When the tightening member 17 is threaded into the collar 9 the shoulder 20 engages a shoulder 21 on the collar 9 on the one side of the gap and forces the gap to narrow, thus adjusting the fit by reducing the diameter of the opening 10 causing the collar to tightly grip the portion 6 thereby holding the mounting plate 2 in a desired position on the suspension frame 1. Tightening member 17 may be provided at the end opposite the threaded end 18 with a configuration 22 to facilitate turning the tightening member 17. In the preferred embodiment the configuration facilitating turning is a cross handle, but it could be any grip enhancing surface configuration such a knurling or could be an enlargement of any shape, such as a loop, ring or knob, or any size enlargement. To facilitate accessability the tightening member is preferably long enough so the configuration 22 extends beyond any accessories mounted to the bottom of the mounting plate 2. In an alternative embodiment the collars are not split and at least one and preferably both collars 9 have a set screw threaded into a radial passage in the collar whereby the set screw may be tightened to press its distal end against the portion 6 thereby locking the collars 9 and thus mounting plate 2 against sliding and rotation. The set screws likewise are preferably long enough to extend below or behind any accessories mounted to the bottom of mounting plate 2 and have a configuration on the proximal end to facilitate turning. Any suitable bushing or bearing may be mounted inside the collar openings or between the collars 9 and portion 6 to facilitate free and smooth rotation and sliding. Alternatively the inner surfaces of the collar openings and/or the outer surface of the portion 6 may be impregnated or coated with suitable anti-friction materials such as oil or polytetrafluoroethylene. In the preferred embodiment the portion 6 is longer than the distance between the outer edges of the collars 9. To permit rotation of the mounting plate about the portion 6 yet prevent inadvertent longitudinal displacement an optional pair of stop collars may mounted on the portion 6 outside of the collars 9. Stop collars preferably have a frictional fit on the portion 6 and touch the outer edges of the collars 9. The stop collars may be short sections of vinyl tubing having a fit on the portion 6 tight enough to prevent inadvertent sliding of the collars 9 during normal use yet loose enough to allow manual repositioning. This allows the mounting plate 2 to be moved from side to side whereby the center of gravity of the apparatus as a whole may be adjusted to compensate for different types and amount of equipment mounted on mounting plate 2. The stop collars could be made from other materials, such as rubber, plastic, metal or wood and could be held in place by a variety of techniques including permanent ones, such as bonding and welding, to eliminate repositioning capability, and temporary ones such as bolts and screws which would allow that capability to be maintained. A washer 23 may be secured by a bolt 24 or otherwise fastened to the outer end of lower arm 4 as a further safety feature to assure the mounting plate 2 and accessories attached thereto do not inadvertently slip off lower arm 4, especially when stop collars are not used.

Another arrangement for pivoting the mounting plate 2 to the portion 6 could use a section of hollow beam of any cross section, such as round, triangular, square, pentagonal and so forth, secured transversely to the underside of the mounting plate 2 with the portion 6 extending through the hollow. In other words, rather than two spaced collars there would be one long collar through which the portion 6 extends.

Figure 2:
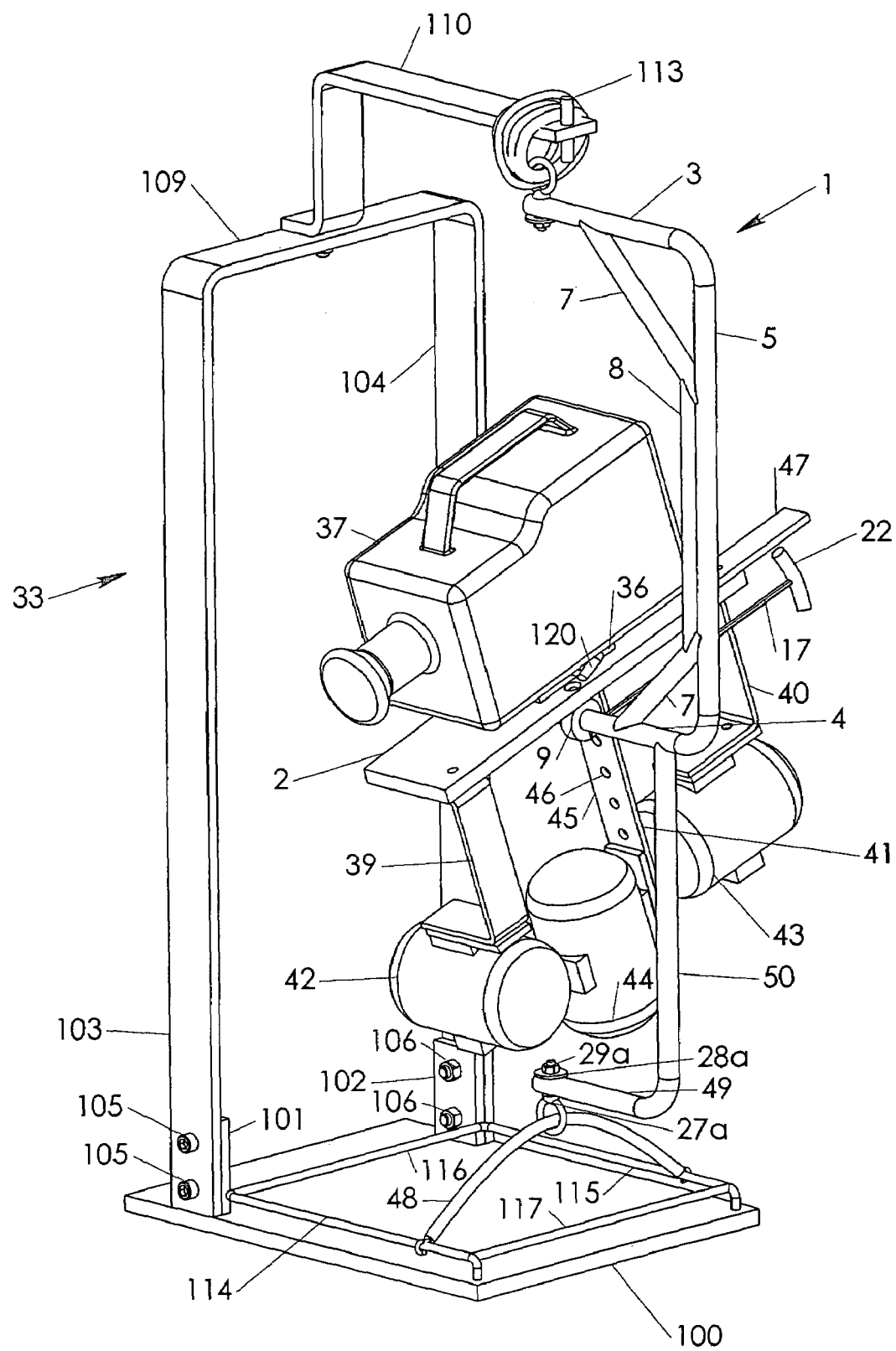
FIG. 2 shows a perspective view of the invention.
Figure 3:
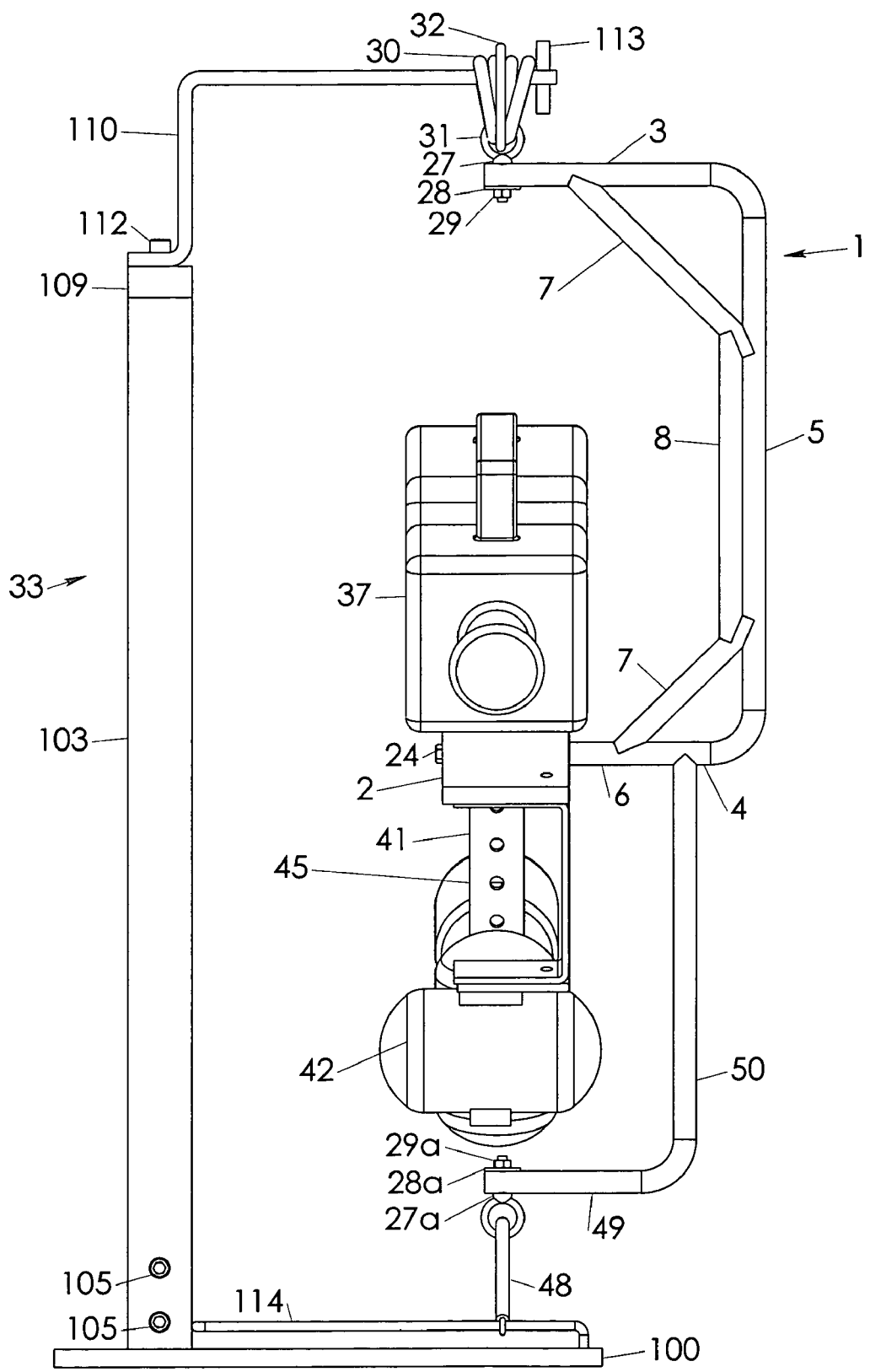
FIG. 3 shows a front view of the invention.
Figure 4:
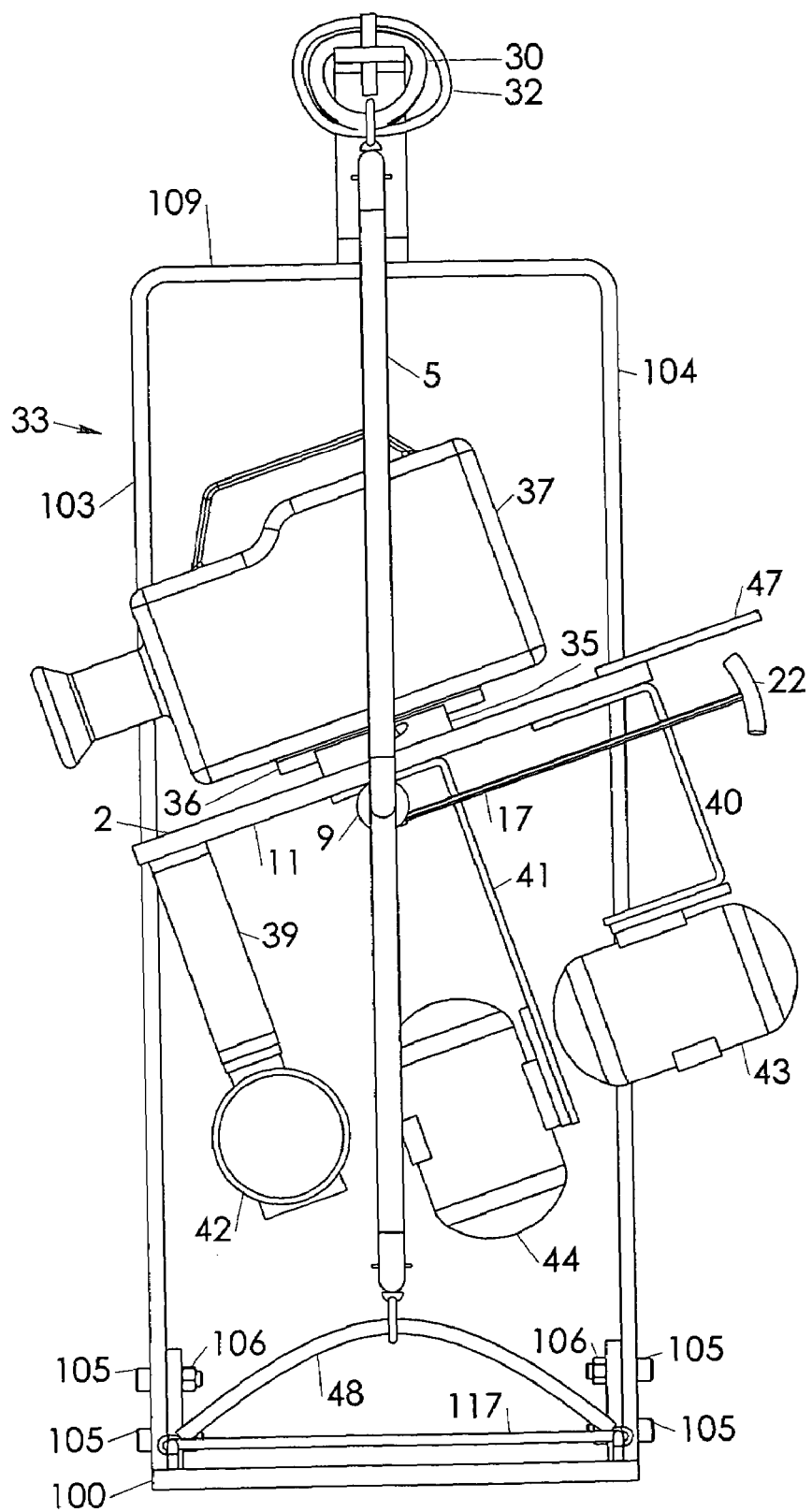
FIG. 4 show a side view of the invention.

Means is provided for suspending the frame assembly with respect to a moving and/or vibrating platform. Where a suitable suspension point is present in or on the moving platform the suspending means takes the form of the upper arm 3 having a vertical hole 25 extending there through at its outer end. The shank 26 of eye-bolt 27 extends through hole 25 with sufficient clearance to permit free and endless rotation and is retained by a washer 28 and nut 29 or other suitable retainer such as a cotter pin, c-clip or the like. To prevent accidental loosening of the nut a single nut of the self-locking type, for example, a nut with a nylon insert such as Nylok® brand lock nut, may be used or a pair of abutting nuts 29 may be used as shown to form a lock to prevent accidental un-threading of the nuts. Any suitable bushing or bearing may be mounted inside the hole 25 or between the hole 25 wall and shank 26 to facilitate free and smooth rotation. A thrust bearing may be positioned between the nut 29 and underside of arm 3 surrounding the shank of the eye-bolt. Alternatively the hole wall and/or the outer surface of the shank 26 an/or touching surfaces of arm 3 and nut 29 may be impregnated or coated with suitable anti-friction materials such as oil or polytetrafluoroethylene. The touching surfaces of the washer 28 and upper arm 3 could be similarly treated. To help isolate the frame assembly from vibrations and provide a form of universal joint allowing the frame assembly as a whole to swing freely in any direction one or more loops 30 of strong flexible preferably elastic material such as bungee cord material extends through the eye 31 of the eye-bolt 27. The flexibility and elasticity of the material both contribute to vibration isolating properties of the loops. Each loop may be formed by knotting the ends of a short length of elastic material together or by overlapping and binding the ends together. A piece of shrink wrap tubing may be placed over the lapped section to reinforce the binding. As can be seen in FIGS. 2 and 3 each loop 30 contacts the arm 110 at a single point along its length. When a single loop is used to suspend the frame assembly this creates a single point or location of suspension. When multiple loops are used there are multiple adjacent points of contact. These points of contact are adjacent each other as clearly shown in FIGS. 2 and 3 to effectively suspend the frame from a single location. Each loop constitutes two elongate sections (the side portions of the loon between the top of the eye 31 and the bottom of the cantilever arm 110) and two hook shaped portions (the top and bottom curved portions of the loop that extend through the eye 31 and over the cantilever arm 110) The operator can pan the camera by rotating the frame assembly about the pivot axis formed by the eye-bolt shank 26 as well as due to the flexibility of the elastic material of the loop(s). Alternatively a short stout bungee cord of the type having hooks on the ends could be hooked at one end through the eye 31. A somewhat larger loop 32 of stronger material such as braided nylon rope or steel cable may be fastened through the eye to act as a safety strap in the event the elastic cord should break. The hole 25 is positioned along the upper arm 3 at a position such that when all equipment is mounted on the mounting plate 2 and the frame is suspended from the elastic loops 30 the frame hangs with the mounting plate 2 balanced level (horizontal) from side to side. Because the location of the center of gravity of the apparatus as a whole will vary when different types and amount of equipment are mounted thereon the upper arm 3 could have a number of holes 25 along its length whereby the eye-bolt can be shifted from hole to hole to adjust the balance. The elastic cord and safety strap are positioned over a hook, bracket or hang line if present in the moving platform. Alternatively, when a suitable suspension point is not already present in or on the moving platform the means for suspending may additionally include a stand component 33 carried on or attached to the moving platform. Likewise the means for suspending may alternatively include a body mounted boom assembly component such as that shown in U.S. Pat. No. 6,481,108 to Helsinki, the specification of which is hereby incorporated by reference, to provide a suitable suspension point on a human or animal who functions as the moving platform.

A mount(s) is/are provided for mounting a video or other camera pointing laterally of the frame assembly, and/or other accessories, to the top of the mounting plate 2. This may take the form of appropriate mounting holes in the plate itself. The preferred embodiment uses any well known quick release 34. Quick release mounts in general include two plates 35, 36 with mating configurations and a latch arrangement which allow the two plates to pivot and lock, slide and lock or twist and lock together yet easily release by operation of a detent, button, lever or the like. See for example U.S. Pat. Nos. 5,108,216 (pivot and lock) 4,570,951 (slide and lock) and 4,763,151 (slide and lock) the disclosures of which are incorporated herein by reference. The base plate 35 of quick release 34 is fastened to the top of mounting plate 2 by suitable means such as bolts, screws, bonding, welding or the like. A video camera 37 or other accessory is similarly attached to the camera mounting plate 36 of quick release 34. The preferred commercially available quick release is the Manfrotto Universal Sliding Plate, available through Bogen Photo Corp., whose web address is www-.bogenphoto.com, as their Cat. No. 3273. This quick release has a base plate 35 formed with a dovetail groove within which slides the camera mounting plate 36 which is formed as a mating dovetail tongue, and a latching arrangement 120 to lock the base plate and camera mounting plate against relative movement. By integrating longitudinal adjustment between the base plate 35 and camera mounting plate 36 as well as quick release functions in a single mount it becomes easy to interchange cameras and adjust their position relative to the frame to help balance the assembly. Separate single function mounts, such as the Manfrotto Micro positioning plate, Bogen Cat. No. 3419, and Stroboframe Auto Quick Release Model 300-QRC, available through B&H Photo, 420 Ninth Ave., New York, N.Y. 10001, whose web address is www.bhphotovideo.com, could also be used, either separately or combined depending on the functionality desired. The mount(s) is(are) positioned on the mounting plate 2 such that the optical axis of the video camera lies in a second vertical plane perpendicular to the first, common, plane in which the three arms lie and perpendicular to the mounting plate 2. While the video camera is depicted pointing in one direction relative to the frame assembly it can also be mounted to point in the reverse direction.

The invention includes means for attaching one or more gyroscopic stabilizers to the underside 11 of the mounting plate 2 is provided. This may take the form of appropriate mounting holes 38 in the plate itself to which the gyros may be directly secured as by bolting. To permit the gyros to be suspended further from the mounting plate 2 suitable spacer brackets 39, 40 and 41 with appropriate mounting holes may be secured at one end to the underside 11 of mounting plate 2 as by bolting and the gyros may be bolted to the other end or along the length of the adapters. A front gyro 42 is shown mounted to a front spacer bracket 39 and a rear gyro 43 is shown mounted to a rear spacer bracket 40. Quick releases similar to those used to mount the camera 37 to the mounting plate 2 could also be provided between the mounting plate 2 and any or all of the spacer brackets 39, 40 and 41 and/or between the spacer brackets 39, 40 and 41 and the gyros. Preferably the invention is used with gyros each of which is constructed to resist rotation about two perpendicular axes. Such gyros are commercially available as the Kenyon Gyro Stabilizer Model Admiral KS-8 by Kenyon Laboratories of Essex, Conn. and whose web address is http://www.kenlab.com. In a preferred arrangement a front gyro 42 will be located under and at the front of the mounting plate 2 and oriented to resist roll rotation and yaw rotation. A rear gyro 43 will be located under and at the rear of the mounting plate 2 and oriented to resist pitch rotation and yaw rotation. This double yaw resistance is particularly advantageous when the frame assembly is used in a helicopter as helicopters are especially susceptible to yaw deviations in flight. An optional center gyro 44 may be mounted to a vertical leg 45 of spacer bracket 41 fastened to the underside of mounting plate 2 between the first and second gyros. The vertical leg 45 lies in a plane perpendicular to the plane of mounting plate 2 and parallel to the longitudinal axis of portion 6. The vertical leg 45 has one or more mounting holes 46 along its length. Center gyro 44 will be mounted to one of the holes 46 of the vertical leg 45 and oriented to resist roll rotation and pitch rotation, thus providing double roll and pitch resistance in addition to double yaw resistance for maximum stability. The relative positions of the gyros could also be changed. For example, The rear gyro 43 (and its adapter 40) could be located in the center and the center gyro 44 (and its adapter 41) moved to the rear. Likewise, the front and center gyros could be interchanged, as could the front and rear gyros.

Applicant believes the greatest balance and stability are achieved if the center of gravity of the apparatus, in use with a camera and gyros, lies within the lower arm 4. When the center of gravity is so positioned the there is little tendency for the camera to tilt inadvertently, the gyros easily counter any such tendency, and the split clamps 9 may be left loose on the portion 6 to provide maximum vibration isolation. By mounting the gyros 42 and/or 43 directly to the mounting plate 2 or using spacer brackets of different length, and by adjusting the position of the center gyro 44 along the length of vertical leg 45, the position of the center of gravity of the apparatus as a whole may be adjusted to compensate for different size and weight cameras and other accessories which may be mounted above the mounting plate 2.

In use a camera and gyros are mounted on the invention and the frame assembly is suspended inside an airplane, helicopter or other moving platform by looping the elastic cord and safety strap over a hook or bracket, or attaching it to a hang line fastened to the platform. Alternatively it could be suspended from an upper arm 110 of the stand component 33 which is itself carried on or attached to the platform. The operator can pan the camera by rotating the frame assembly about the pivot axis formed by the eye-bolt shank 26 as well as due to the flexibility of the elastic material of the loops. The camera can be tilted by exerting force against the frame assembly or by rotation of the mounting plate about the lower arm 4 when the spit ring is loosened. The gyros will tend hold the camera in a steady orientation regardless of changes in the orientation of the platform.

To facilitate panning and tilting of the frame assembly or mounting plate and camera the mounting plate 2 may optionally be provided with a control arm 47 extending from the back of the plate. The control arm is preferably removably attached by bolts and nuts to the mounting plate 2.

For added stability and security in some applications a second eye-bolt 27a, washer 28a and nut 28a may be pivoted in inverted position to a third horizontal arm 49 spaced from the lower arm 4 by a second vertical arm 50. A second elastic cord arrangement comprising one or more elastic cords 48 may be attached to or through eye-bolt 27a and to one or more anchor points on the platform beneath the frame assembly to keep the frame assembly from swinging too far in the event of excessive changes of orientation of the platform without materially impeding the ability of the frame assembly to swing in any direction. For example, the second elastic cord could be looped around the base 100 of the stand component 33. Rather than looping the second elastic cord around the base of the stand component 33 it could be connected to a second, lower arm similar to the upper arm 110, or a hook extending upwardly from the base 100 of the stand component 33, or preferably to rails 114, 115, 116 and or 117 provided on the base 100 for that purpose.

The construction of the frame assembly is such that it can held by an operator rather than being suspended, such as by manually grasping the connecting arm 5. It also could be suspended from a boom anchored to the operator, such as that shown un U.S. Pat. No. 6,481,108 to Helsinki, whereby the operator functions as the moving platform. Either operator supported arrangement can be used where a separate moving platform, such as a row boat, lacks a suitable overhead suspension point.

A preferred embodiment of stand component 33 includes a base 100, uprights 103 and 104 spanned by cross member 109, and cantilever arm 110. The base 100 and other parts of the stand are preferably solid steel but could alternatively be of any other relatively heavy material as a means for providing the desired weight to the stand. The base 100 and other parts could also be made of a less dense material than steel and provided with additional means to provide the desired weight. Such additional means include making the base hollow to accept removable ballast material such as sand, water or other substance, providing a bladder or other container on the base or other parts to accept such ballast material, or attaching one or more separate weights to the base or other parts. Such additional means to provide the desired weight allows the base to have the necessary weight in use yet allow reducing weight during shipping or transport. The base 100 is preferably a flat piece of material of rectangular shape but could be of any desired shape. A pair of flanges 101 and 102 are secured to the base 100 and extend upwardly therefrom at one end. These flanges are spaced inwardly slightly from the adjacent edges of the base 100. Abutting the outside of each flange is a respective upright 103 and 104. The uprights are bolted to their respective flanges by bolt 105 and nut 106 assemblies passing through holes 107 and 108 in the flanges and uprights respectively. Connected to and spanning the uprights 103 and 104 above the base 100 is a cross member 109. Cantilever arm 110 is bolted centrally to the top of cross member 109, by a nut 111 and bolt 112 assembly passing through holes therein, and extends forwards from cross member 109 over base 100. At the outer end of cantilever arm 110 is a pin 113 which is secured in a hole in the cantilever arm 110 to extend above and, optionally, below the cantilever arm 110. A first pair of rails 114 and 115 are secured above the base 100, at their rear ends, to flanges 101 and 102, and at their front ends to the base. The front ends of the rails are bent downwardly where they attach to the base so there is a gap between the undersides of the rails and the base. A second pair of spaced apart rails 116 and 117 may extend between the first pair of rails. In the preferred embodiment the stand weighs about 40 pounds overall with most of the mass concentrated in the base 100. This provides a low center of gravity even when a frame assembly with camera and gyroscopic stabilizers of approximately the same total weight is suspended from the cantilever arm. The low center of gravity and overall mass of the apparatus in use aids stability to resist sliding or tipping of the stand when acted upon by some of the forces encountered when used on or in moving platforms. Various parts of the stand could be used as attachment points for suitable tie downs to further anchor the stand to a platform to enable it to resist greater forces.

The upper loops 30 and safety loop 32 are positioned over cantilever arm 110 behind pin 113 of the support component to suspend the frame assembly, and lower elastic cord 48 passes through the lower eye bolt 27a and is hooked at each end to a different one of the rails such as 114 and 115 to stabilize the lower end of the frame assembly. The elastic loops 30 may be positioned along the cantilever arm 110 independently of the position of the elastic cord 48 relative to the rails 114, 115 to adjust the tilt of the frame assembly and attached camera. The lower end of the frame assembly may be adjusted laterally of the base by sliding along the lower elastic cord.

To facilitate shipping, transport and storage of the stand component the nut 111 and bolt 112 assembly may be removed to release the cantilever arm 110 from the cross member 109. Likewise, nut and bolt assemblies 105, 106 may be removed to release the uprights 103 and 104 from their respective flanges 101 and 102. The uprights may then be rotated to lie on the base 100. The cantilever arm 110 may be laid upon the base between the uprights, or along one of the uprights or cross member. One or more nut and bolt assemblies may by be used to reattach the uprights to the flanges to secure them against movement during shipping, transport or storage. A hole or holes could be provided in the base or one of the uprights, or adjacent one end of the cross member whereby the nut and bolt assembly could be used to fasten the cantilever arm to the base, upright or cross member during shipping, transport or storage.

The preferred embodiment has the flanges 101 and 102 spaced inwardly from the edges of the base 100 and the uprights 103 and 104 with squared off ends abutting the base 100. This requires removal of both sets of bolts to fold the uprights. Alternatively, the ends of the uprights could be spaced above the base, or the ends of the uprights could be radiused to provide sufficient clearance so the uprights can be pivoted by removing only one nut and bolt assembly on each side. Also, the flanges could be positioned flush with the edges of the base so the uprights are outside the edges of the base. With this arrangement the uprights could be pivoted about one set of bolts when the other set is removed.

While the depicted embodiment uses nut and bolt assemblies to secure the various parts other arrangements are possible. For example, the hole in cross member 109 could be threaded and the bolt threaded directly thereto, or the hole in cantilever arm could be the threaded hole, thereby eliminating the need for a separate nut which could be lost. Likewise the flanges or uprights could be provided with similar threaded holes.

The pin 113 could be two separate pieces secured to the top and bottom of the cantilever arm rather than a single piece extending through a hole in the cantilever arm. Because a portion of the pin 113 extends below the cantilever arm 110 the arm may be turned upside down and secured under the cross member 109 to position it closer to the base to accommodate a similar but smaller frame assembly.

It is possible to use a single upright with the cantilever arm attached to its upper end. The use of two spaced uprights is preferred because it allows the frame assembly to be hung with the camera pointed toward or extending through the gap between the uprights and still allow the suspension point to be moved forward or back along the cantilever arm in alignment with the optical axis of the camera without blocking the field of view of the camera.

While the apparatus of the invention is described with respect to image capturing it is to understood that the invention may be applied wherever it is desired to provide a stabile reference point in or on a moving and/or vibrating platform.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. Apparatus to facilitate stably supporting a camera or other device relative to a moving and/or vibrating platform, said apparatus comprising:
    a frame assembly;
    a member mounted to said frame assembly, said member having means for mounting the camera pointing laterally of the frame assembly, or other device, thereto, and means for mounting stabilizing means thereto; and
    means for suspending said frame assembly from a point above said member for free swinging movement in any direction, the means for suspending comprising:
    a base for resting on a surface of the moving and/or vibrating platform;
    at least one upright secured to the base and extending upwardly therefrom; and means attached adjacent the upper end of the upright for forming a suspension point above said base; and
    a suspension member extending between said suspension point and said frame assembly.

2. The apparatus of claim 1 wherein said suspension member comprises elastic material.

3. The apparatus of claim 1 further comprising means engaging the frame assembly and the base for limiting the range of swinging movement of the frame assembly.

4. Apparatus to facilitate stably supporting a camera or other device relative to a moving and/or vibrating platform, said apparatus comprising:
    a frame assembly;
    a member mounted to said frame assembly, said member having means for mounting the camera pointing laterally of the frame assembly, or other device, thereto, and means for mounting stabilizing means thereto, the means for mounting stabilizing means comprising at least one opening in said member permitting the stabilizing means to be attached directly under the member; and means for suspending said frame assembly from a point above said member for free swinging movement in any direction.

5. Apparatus to facilitate stably supporting a camera or other device relative to a moving and/or vibrating platform, said apparatus comprising:
   a frame assembly;
   a member mounted to said frame assembly, said member having means for mounting the camera pointing laterally of the frame assembly, or other device, thereto, and means for mounting stabilizing means thereto;
   stabilizing means attached to said member; and
   means for suspending said frame assembly from a point above said member for free swinging movement in any direction.

6. Apparatus to facilitate stably supporting a camera or other device relative to a moving and/or vibrating platform, said apparatus comprising:
   a frame assembly;
   a member mounted to said frame assembly, said member having means for mounting the camera pointing laterally of the frame assembly, or other device, thereto, and means for mounting stabilizing means thereto, the means for mounting stabilizing means comprising at least one spacer bracket having a first end secured to and extending downwardly from the member and having means spaced from the first end for receiving the stabilizing means; and
   means for suspending said frame assembly from a point above said member for free swinging movement in any direction.

7. Apparatus to facilitate stably supporting a camera or other device in or on a moving and/or vibrating platform, said apparatus comprising:
   a generally C-shaped frame portion partially surrounding a camera receiving space, said frame portion having and upper arm, a spaced apart lower generally horizontal arm and a generally vertically positioned connecting member connecting said upper and lower arms;
   a plate having means for mounting a camera or other device thereto above said plate within said camera receiving space, and said plate having means for mounting stabilizers thereto;
   means encircling said lower arm for mounting said plate to said lower arm for tilting about a generally horizontal axis, said means for encircling said lower arm including means for adjusting its fit about the lower arm from one state of adjustment wherein the fit is loose on the lower arm and permits tilting of the plate and a second state of adjustment wherein the fit is a tight grip on the lower arm and prevents tilting of the plate; and
   means for suspending said frame, from a point above the upper arm, for free swinging movement of said frame in any direction, for rotation of said frame about a generally vertical axis and for isolating said frame from vibration.

8. The apparatus of claim 7 wherein said means for suspending comprises an eye-bolt having a shank extending downwardly through a vertical hole in said upper arm and rotatable therein.

9. The apparatus of claim 8 wherein said means for suspending further comprises:
   a base plate for resting on a surface of the moving and/or vibrating platform;
   a pair of spaced apart uprights secured at their lower ends to the base plate and bridged at their upper ends by a cross member;
   a cantilever arm secured at one end to a central area of said cross member and extending over said base plate at a distance therefrom greater than the vertical dimension of said frame portion; and
   at least one elastic cord engaging the eye of the eye-bolt and also engaging the cantilever arm.

10. The apparatus of claim 9 which further comprises a second vertically positioned connecting member secured to and depending from said lower arm and having an additional arm positioned aligned with and beneath said upper and lower arms;
   a second eye-bolt having a shank extending upwardly through a vertical hole in said additional arm and rotatable therein; and
   an elastic cord engaging the eye of said second eye-bolt and said base plate for limiting the range of swinging movement of said frame portion.

11. The apparatus of claim 7 wherein the means for suspending further comprises:
   a base for resting on a surface of the moving and/or vibrating platform;
   at least one upright secured to the base and extending upwardly therefrom; and means attached adjacent the upper end of the upright for forming a suspension point above said base; and
   a suspension member extending between said suspension point and said frame assembly.

12. The apparatus of claim 11 wherein the at least one upright comprises a pair of spaced apart uprights secured at their lower ends to the base plate and bridged at their upper ends by a cross member.

13. The apparatus of claim 12 wherein said means attached adjacent the upper end of the upright comprises a cantilever arm secured at one end to a central area of said cross member and extending over said base plate at a distance therefrom greater than the vertical dimension of said frame portion.

14. The apparatus of claim 7 having stabilizing means attached to said plate.

15. Apparatus to facilitate stably supporting a camera or other device in or on a moving and/or vibrating platform, said apparatus comprising:
   a generally C-shaped frame portion partially surrounding a camera receiving space, said frame portion having and upper arm, a spaced apart lower generally horizontal arm and a generally vertical connecting member connected to each of said upper and lower arms with said arms extending laterally therefrom;
   first bracing means extending and connected between the upper arm and the connecting member;
   second bracing means extending and connected between the lower arm and the connecting member;
   reinforcing means extending along and connected to the connecting member between the first and second bracing means;
   a member having means for mounting a camera or other device thereto above said plate within said camera receiving space, and means for mounting stabilizers thereto;

means for mounting said member to said lower arm for tilting about a generally horizontal axis, said means for mounting including means for adjusting its fit with respect the lower arm from one state of adjustment wherein the fit is loose on the lower arm and permits tilting of the member and a second state of adjustment wherein the fit is a tight grip on the lower arm and prevents tilting of the member; and means for suspending said frame from a point above the upper arm for free swinging movement in any direction.

16. The apparatus of claim 15 having stabilizing means attached to said member.

17. Apparatus to facilitate stably supporting a camera or other device relative to a moving and/or vibrating platform, said apparatus comprising:

a frame assembly;

a member having means for mounting the camera or other device, thereto;

means for mounting stabilizing means to said apparatus; and a suspension, vibration and gross motion isolating, and rotation permitting member comprising at least one loop of elastic material attached at one diametric location to an upper portion of the frame assembly, and attachable at an opposite diametric location to an overhead support location.

18. Apparatus to facilitate stably supporting a camera or other device relative to a moving and/or vibrating platform, said apparatus comprising:

a frame assembly;

a member having means for mounting the camera or other device, thereto;

means for mounting stabilizing means to said apparatus; and a suspension, vibration and gross motion isolating, and rotation permitting member comprising at least one elongate section of elastic material extending between two opposite end, one end of said suspension member having a hook shaped portion attached to said frame assembly and the other end having a hook shaped portion for attaching said suspension member to an overhead support location.

* * * * *